United States Patent [19]

Farquhar

[11] Patent Number: 5,526,980
[45] Date of Patent: Jun. 18, 1996

[54] CONDENSATE TRAPS

[75] Inventor: Keith R. Farquhar, Cheltenham, United Kingdom

[73] Assignee: Spirax-Sarco Limited, Gloucestershire, United Kingdom

[21] Appl. No.: 355,269

[22] Filed: Dec. 12, 1994

[30] Foreign Application Priority Data

Aug. 5, 1994 [GB] United Kingdom .................. 9415879

[51] Int. Cl.⁶ ..................................................... F16T 1/10
[52] U.S. Cl. .......................................... 236/56; 137/599.2
[58] Field of Search .......................... 137/599.2; 236/56, 236/58

[56] References Cited

U.S. PATENT DOCUMENTS

| | | |
|---|---|---|
| 1,677,148 | 7/1928 | Rosner . |
| 3,106,937 | 10/1963 | Sands . |
| 3,428,089 | 2/1969 | Kachergis . |
| 3,653,406 | 4/1972 | Racki .................. 137/599.1 |
| 3,794,071 | 2/1974 | Scott ................... 137/599.2 |
| 4,288,032 | 9/1981 | Hetz ........................ 236/56 |
| 4,387,732 | 6/1983 | Hetz ................... 236/56 X |
| 4,624,281 | 11/1986 | Vidal et al. . |
| 5,095,943 | 3/1992 | Ashi . |
| 5,107,896 | 4/1992 | Otto . |

FOREIGN PATENT DOCUMENTS

| | | |
|---|---|---|
| 0168781 | 1/1986 | European Pat. Off. . |
| 0421713 | 4/1991 | European Pat. Off. . |
| 1393181 | 5/1975 | United Kingdom . |

OTHER PUBLICATIONS

Motoyama Brochure, UNITRAP (no date).
Venn Brochure, ATB-5 (no date).
Fuchiman Brochure (no date).
OVK Machine Works Brochure (no date).

*Primary Examiner*—William E. Tapolcai
*Attorney, Agent, or Firm*—Willlian Brinks Hofer Gilson & Lione

[57] ABSTRACT

A condensate trap assembly comprises a valve body 2 having a housing 14 which defines an inlet passage 10 and an outlet passage 12, and an access passage 16 within which a condensate trap 4 is housed. The housing 14 also defines a valve chamber 18 within which a valve element 6 is received for rotation, the valve element 6 comprising a body within which there are provided flow passageways 22A, 22B, 22C. The valve element 6 has a projection 36 which extends into the access passage 16. The projection 36 prevents debris from collecting within the valve chamber 18, and the projection 36 may have a recessed channel 40 for catching any such debris.

14 Claims, 1 Drawing Sheet

CONDENSATE TRAPS

FIELD OF THE INVENTION

This invention relates to condensate traps, and more particularly to condensate traps having a bypass/isolating valve.

BACKGROUND OF THE INVENTION

Condensate traps are commonly used in steam systems (in which circumstances they are usually referred to as steam traps). Their function is to discharge condensed water from the system, without allowing steam to escape. If steam is lost from the system, this represents a waste of energy. Steam traps thus commonly comprise a valve which is responsive to the presence of condensate or steam in the vicinity of the valve, so that the valve opens when condensate is present and closes when steam is present.

SUMMARY OF THE INVENTION

According to the present invention there is provided a condensate trap assembly comprising a valve body provided with a valve chamber into which open an inlet passage and an outlet passage, a valve element being disposed within the valve chamber for operative rotation about a rotary axis, the valve body comprising an access passage for receiving a trap element, the access passage opening into the valve chamber and being aligned with the rotary axis, the valve element having a projection which is a close fit within the access passage.

Preferably the access passage comprises a cylindrical bore within the valve body, and the projection of the valve element then may have a cylindrical outer surface for engagement within the bore.

The valve element preferably defines a plurality of passageways which, depending upon the operative position of the valve element, communicate with the inlet passage and/or the outlet passage of the valve body. A first passageway in the valve element may have a port located on the rotary axis. The projection may be cylindrical or annular in shape, and preferably the projection has an annular shape, the inner opening of which defines a channel which communicates with the port of the first passageway on the rotary axis of the valve element.

The projection may have an annular recess which extends around the free end face of the projection. If the assembly is installed with this free end face directed upwardly, the recess acts as a catchment for debris to prevent the debris from passing into the valve chamber.

Preferably, a second passageway within the valve element opens into a second passageway port which is offset from the rotary axis and which communicates with the free end face of the projection, for example into the recess.

The valve element may be disposed within the chamber for operative rotation between three positions in which, respectively:

(1) the inlet passage and the outlet passage are closed by the valve element;

(2) the inlet passage communicates with the outlet passage through a third passageway in the valve element, (3) one of the inlet passage and the outlet passage communicates with the free end face of the projection through the second passageway in the valve element and the other of the inlet passage and the outlet passage communicates with the channel in the valve element through the first passageway in the valve element.

Preferably, the inlet and the outlet passages are aligned on a common axis, and the axis of rotation of the valve element may be perpendicular to the common axis. The valve element preferably comprises a part-spherical portion in addition to the projection.

BRIEF INTRODUCTION TO THE DRAWING

For a better understanding of the present invention and to show more clearly how it may be carried into effect, reference will now be made, by way of example, to the accompanying drawing, which is a sectional view of a condensate trap assembly.

DESCRIPTION OF PREFERRED EMBODIMENT

Figure 1:
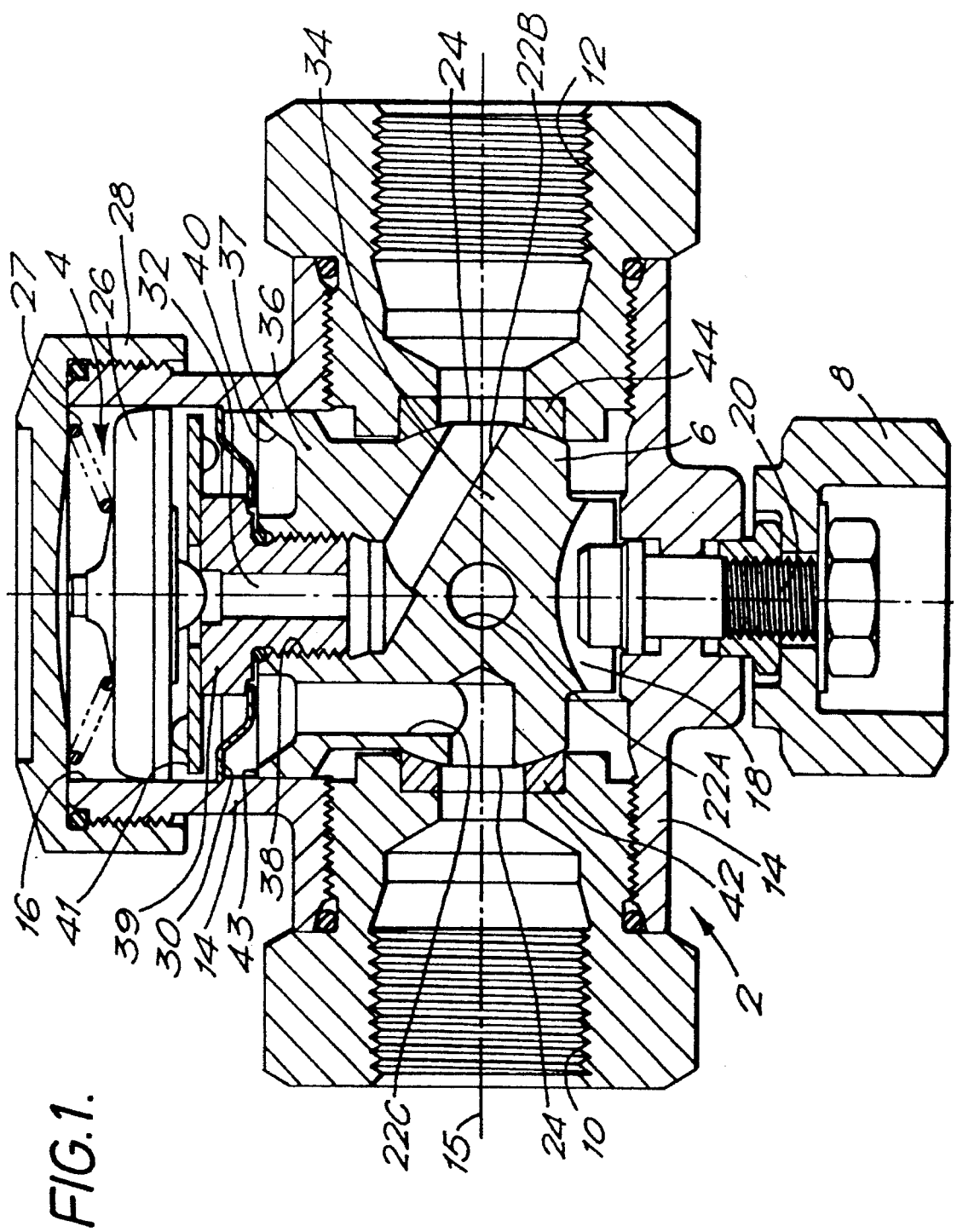

The condensate trap assembly shown in FIG. 1 comprises a valve body 2 which houses a condensate trap 4 and a valve element 6. The valve body 2 has an adjustment knob 8 which enables selection between operative modes of the valve body 2, which correspond to operative positions of the valve element 6.

The valve body 2 comprises a housing 14 which defines an inlet passage 10 and an outlet passage 12, and also defines an access passage 16 within which the condensate trap 4 is housed. The inlet and outlet passages 10, 12 are co-axially aligned on an axis 15. The housing 14 also defines a valve chamber 18 within which the valve element 6 is received for rotation, by means of an operating spindle 20, about a rotation axis which is perpendicular to the common axis 15 of the inlet passage 10 and the outlet passage 12. The inlet passage 10 and the outlet passage 12 are sealed from the valve chamber 18 by respective seals 42, 44.

The access passage 16 comprises a cylindrical bore which is aligned with the rotation axis of the valve element 6.

The valve element 6 comprises a body within which there are provided flow passageways 22A, 22B, 22C which terminate at ports 24 on the outer surface of the valve element 6. According to the angular position of the valve element 6, the passageways 22 determine the fluid connections between the inlet and outlet passages 10, 12 and the condensate trap 4.

The valve element has a part-spherical portion 34 housed within the valve chamber 18 and a projection 36 which extends into the access passage 16. The valve element 6 has a first passageway 22B which extends from a side portion of the valve element 6 to an upper portion of the valve element on the axis of rotation, and terminates at a central port, a second passageway 22C which connects a side portion of the valve element, opposite to the side portion of the first passageway 22B, with an upper region of the valve element offset from the axis of rotation, and a third passageway, 22A which extends across the valve element 6.

The projection 36 on the valve element 6 is annular in shape and has an enlarged diameter end portion 37. The outer peripheral surface of the end portion 37 cooperates with the inner wall of the access passage 16. Thus, the projection provides a barrier between the access passage 16 and the valve chamber 18. The opening 38 within the annular projection 36 has an internal screwthread and receives a seat 39. The seat 39 has a duct 32 which communicates at one end with the first passageway 22B. The other end of the duct 32 is opened and closed in dependence on the condition of the condensate trap 4.

The condensate trap 4 comprises a steam trap capsule 26 which is positioned above the seat 39 by a spacer 41. A spring 27, acting between the capsule 26 and a cap 28, holds the capsule 26 against the spacer 41. The condensate trap 4 has a screen 30 which extends across the gap between the seat 39 and the wall of the access passage 16, this gap defining an inlet of the trap. The duct 32 serves as the outlet of the trap 4.

Thus, the passageway 22B communicates, in all angular positions of the valve element 6, with the outlet of the condensate trap 4. The inlet of the condensate trap 4 communicates, through the screen 30, with the second passageway 22C.

The free end face 43 of the projection 36 of the valve element 6 is provided with an annular recess 40 which acts as a gutter. The second passageway 22C opens into the recess 40.

For use, the condensate trap assembly is installed in the orientation shown in the Figure, that is with the free end face 43 of the projection 36 facing upwardly. Fluid enters the inlet passage 10 of the valve body 2. The valve has three modes of operation.

In a first operative mode, normal use of the steam trap may be selected. This selection is made by appropriate positioning of the knob 8 which alters the angular position of the valve element 6 within the valve chamber 18 and access passage 16. In FIG. 1, the valve element 6 is in the position for normal operation. The inlet passage 10 is connected to the inlet of the condensate trap 4 through the second passageway 22C of the valve element 6. The duct 32, comprising the outlet of the condensate trap 4, communicates with the first passageway 22B. This passageway 22B opens into the outlet 12, and the inlet 10 and outlet 12 are thereby connected through the condensate trap 4, and flow between the inlet 10 and the outlet 12 is controlled by the trap 4.

A second mode of operation is to by-pass the condensate trap 4. This mode of operation is achieved when the valve element 6 is rotated through 90° relatively to the position shown in FIG. 1. Thus, the third passageway 22A, which extends across the valve element 6, directly connects the inlet 10 and outlet 12. Steam or condensate therefore passes directly from the inlet passage 10 to the outlet passage 12 without going through the trap 4.

The third mode of operation is one in which the inlet passage 10 of the valve body 2 is totally isolated, which enables removal of the steam trap 4 for servicing or replacement. This is achieved when none of the passageways of the valve element 6 communicate with the inlet passage 10. In this position of the valve element 6, the outlet passage 12 is also closed.

During normal use of the condensate trap installation, unwanted debris within the fluid flow may enter the installation. The screen 30 prevents the passage of such debris into the internal components of the condensate trap 4. Such debris may therefore collect beneath the screen 30, and will tend to drop towards the valve chamber 18. The projection 36 prevents such debris from collecting within the valve chamber 18 thereby causing premature deterioration of the seals 42, 44. Instead, the debris is caught within the recess 40 defined in the projection 36. Any such debris collected may be removed when the condensate trap 4 is being serviced.

In addition, the engagement of the projection 36 within the access passage 16 ensures accurate alignment of the valve element 6 within the valve chamber 18, and this further reduces wear of the seals 42, 44 and ensures correct operation of the condensate trap installation.

I claim:

1. A condensate trap assembly comprising
   a valve body;
   a valve chamber provided in the valve body;
   an inlet passage and an outlet passage which open into the valve chamber;
   a valve element disposed within the valve chamber for operative rotation about a rotary axis;
   an access passage provided in the valve body and adapted to receive a trap element, the access passage opening into the valve chamber and being aligned with the rotary axis; and
   a projection on the valve element which is a close fit within the access passage.

2. An assembly as claimed in claim 1, in which the access passage comprises a cylindrical bore within the valve body.

3. An assembly as claimed in claim 2, in which the projection of the valve element has a cylindrical outer surface for engagement within the bore.

4. An assembly as claimed in claim 1, in which the valve element defines a plurality of passageways, the valve element being operatively rotatable about the rotary axis to position at least one of the passageways selectively in or out of communication with the inlet passage of the valve body.

5. An assembly as claimed in claim 1, in which the valve element defines a plurality of passageways, the valve element being operatively rotatable about the rotary axis to position at least one of the passageways selectively in or out of communication with the outlet passage of the valve body.

6. An assembly as claimed in claim 4 or 5, in which a first one of the passageways in the valve element has a port located on the rotary axis.

7. An assembly as claimed in claim 6, in which the projection has an annular shape.

8. An assembly as claimed in claim 7, in which the inner opening of the annular projection defines a channel which communicates with the port of the first passageway on the rotary axis of the valve element.

9. An assembly as claimed in claim 8, in which the projection has a free end face and an annular recess which extends around the free end face.

10. An assembly as claimed in claim 9, in which the valve element has a second passageway which opens into a second passageway port which is offset from the rotary axis and which communicates with the free end face of the projection.

11. An assembly as claimed in claim 10, in which the valve element has a third passageway and is disposed within the chamber for operative rotation selectively between three positions in which, respectively:
   (1) the inlet passage and the outlet passage are closed by the valve element;
   (2) the inlet passage communicates with the outlet passage through the third passageway in the valve element,
   (3) one of the inlet passage and the outlet passage communicates with the free end face of the projection through the second passageway in the valve element and the other of the inlet passage and the outlet passage communicates with the channel in the valve element through the first passageway in the valve element.

12. An assembly as claimed in claim 11, in which the inlet and the outlet passages are aligned on a common axis, and the rotary axis of the valve element is perpendicular to the common axis.

13. An assembly as claimed in any preceding claim, in which the valve element comprises a part-spherical portion in addition to the projection.

14. A condensate trap assembly, comprising:

a valve body;

a valve chamber provided in the valve body;

an inlet passage and an outlet passage which open into the valve chamber;

a valve element disposed within the valve chamber for operative rotation about a rotary axis;

an access passage provided in the valve body and adapted to receive a trap element, the access passage opening into the valve chamber and being aligned with the rotary axis; and a projection on the valve element which is a close fit within the access passage and has a free end face which, in use, is directed upwardly and an annular recess which extends around the free end face.

* * * * *